(12) United States Patent
Shaw et al.

(10) Patent No.: US 7,586,068 B2
(45) Date of Patent: Sep. 8, 2009

(54) DISPOSABLE MICROWAVE FOOD SHIELD

(76) Inventors: Peter Shaw, 125 E. View Rd., Lake Ronkonkoma, NY (US) 11779; Michael Hellmann, 36 Vineyard Way, Mount Sinai, NY (US) 11766-1829

( * ) Notice: Subject to any disclaimer, the term of this patent is extended or adjusted under 35 U.S.C. 154(b) by 385 days.

(21) Appl. No.: 11/437,327

(22) Filed: May 19, 2006

(65) Prior Publication Data

US 2006/0213905 A1    Sep. 28, 2006

Related U.S. Application Data

(63) Continuation-in-part of application No. 11/134,676, filed on May 23, 2005, now Pat. No. 7,414,229.

(60) Provisional application No. 60/641,020, filed on Jan. 4, 2005.

(51) Int. Cl.
*H05B 6/80* (2006.01)

(52) U.S. Cl. ...................... 219/729; 219/725

(58) Field of Classification Search ............... 219/729, 219/725, 726, 727, 728, 730, 731, 732, 733, 219/734, 735

See application file for complete search history.

(56) References Cited

U.S. PATENT DOCUMENTS

| | | | |
|---|---|---|---|
| 4,303,817 A | 12/1981 | Klement et al. | |
| 4,332,091 A | 6/1982 | Bensussan et al. | |
| 4,357,513 A | 11/1982 | Kawata et al. | |
| 4,814,568 A | 3/1989 | Keefer | |
| 4,873,406 A | 10/1989 | Connor | |
| 5,015,813 A | 5/1991 | Yamada et al. | |
| 5,211,808 A | 5/1993 | Vilardi et al. | |
| 5,239,153 A | 8/1993 | Beckett | |
| 6,003,671 A | 12/1999 | McDonough | 206/493 |
| 6,386,498 B1 | 5/2002 | Deco | |
| 6,803,552 B1 * | 10/2004 | Irizarry et al. | 219/732 |

OTHER PUBLICATIONS

PCT/US06/19881, Jun. 20, 2007, PCT International Search Reports.

* cited by examiner

*Primary Examiner*—Daniel L Robinson
(74) *Attorney, Agent, or Firm*—Alfred M. Walker (57) ABSTRACT

A device and method are provided for protecting the inside of a microwave oven from food splattering during cooking. The device is made of breathable food grade paper, is a truncated cone in shape with a pleated side wall for rigidity and at least one reinforcing structure on a top surface. Top surface reinforcement may be one or more folded paper reinforcement bars or folded paper reinforcement members, shaped as circles, squares, or any other convenient shape. Reinforcement bars may be radial across the top surface or nonradial, and may be linear or curvilinear. The food shield device is made by conventional paper die stamping methods.

18 Claims, 6 Drawing Sheets

DISPOSABLE MICROWAVE FOOD SHIELD

CROSS REFERENCE TO RELATED APPLICATIONS

The following is a Continuation-in-Part of currently pending U.S. patent application Ser. No. 11/134,676 filed May 23, 2005 now U.S. Pat. No. 7,414,229, and claims priority therefrom under 35 U.S.C. §120. This application is also based in part on prior provisional application number 60/641,020 dated Jan. 4, 2005, and claims benefit therefrom under 35 U.S.C. §119(e).

STATEMENT REGARDING FEDERALLY SPONSORED RESEARCH OR DEVELOPMENT

Not applicable

REFERENCE TO SEQUENCE LISTING, A TABLE, OR A COMPUTER PROGRAM LISTING COMPACT DISC APPENDIX

Not applicable

FIELD OF THE INVENTION

The present invention relates to disposable covers for microwavable food dishes.

BACKGROUND OF THE INVENTION

The invention relates generally to devices which are used in food preparation to prevent splatter of the food and also relates generally to disposable products. More specifically, the invention relates to a paper-based, disposable shield, which will be used in the preparation of food in a microwave oven, so as to prevent the splatter of food onto the interior surface of a microwave oven.

The use of microwave ovens to prepare meals has become commonplace. That is to say the microwave is no longer used only to reheat beverages or prepared and prepackaged meals. It is now commonly used for almost all cooking and heating applications from leftovers to complete meals. One of the difficulties in using microwave ovens is the generation of "Hot Spots" due to the lack of uniformity of microwave penetration within the substance being heated. These "Hot Spots" cause one or more small areas of the food being heated to reach a rapid localized boiling point and explode or pop, thereby splattering bits of food onto the interior surface of the microwave oven.

Current methods of reducing "Hot Spots" include rotating turntables which continually rotate the food as to distribute the internal microwave energy. Even with the use of these turntables, the food often splatters leaving the inside of the microwave soiled and in need of cleaning. Furthermore, there are instances where it is necessary to bring the food to a boil, and when such boiling occurs, the microwave oven is likely to be soiled by the splatter of the boiling food.

Currently, the most common method of preventing microwave ovens from being splattered with food is to cover the food being heated with another dish or lid. If an entire dish, such as a casserole, is being prepared, the lid may be used to prevent food splatter. However, it is very common to heat food on a serving dish, plate, bowl or other lidless container. In such cases, another plate is often placed over the open heating dish in order to protect the interior of the microwave. The problem here is that the person now has two dishes to wash from the preparation of a single dish of food. Alternatively, people often place a paper towel or napkin over the food being heated to protect against splatter. The use of the paper towel or napkin is desirable because it is relatively inexpensive to use and can simply be discarded after use. The napkin or paper towel rests on the food and absorbs any splatter caused by the "Hot Spots" or boiling food. The use of the napkin or paper towel, however, results in the undesirable absorption of liquids from the food, such as cheese, cream's or sauces. This absorption also causes the paper towel or napkin to stick to the food.

Consequently, there is a need for a device and method for covering food during microwave cooking and heating so as to protect the interior of the microwave from being soiled with splattering food. There is also the need for this device and method of covering food to eliminate the addition of more dirty dishes and not leave paper towels or napkins sticking to the food. This device needs to be inexpensive and easy to use.

OBJECT OF THE INVENTION

It is therefore an object of the present invention to provide a disposable, structurally sound sanitary cover for microwavable food dishes, to prevent splatter therefrom.

Other objects which become apparent from the following description of the present invention.

BRIEF SUMMARY OF THE INVENTION

The present invention provides a disposable yet rigid shield to be placed over and above the food, covering it, on a serving plate or other lidless dish so as to block the splatter of food and prevent soiling of the interior of the microwave. The device of the present invention is inexpensive (similar in cost to a paper towel), easy to use, and disposable.

BRIEF DESCRIPTION OF THE SEVERAL VIEWS OF THE DRAWINGS

The present invention can best be understood in connection with the accompanying drawings. It is noted that the invention is not limited to the precise embodiments shown in drawings, in which.

DETAILED DESCRIPTION OF THE DRAWINGS

Figure 1:
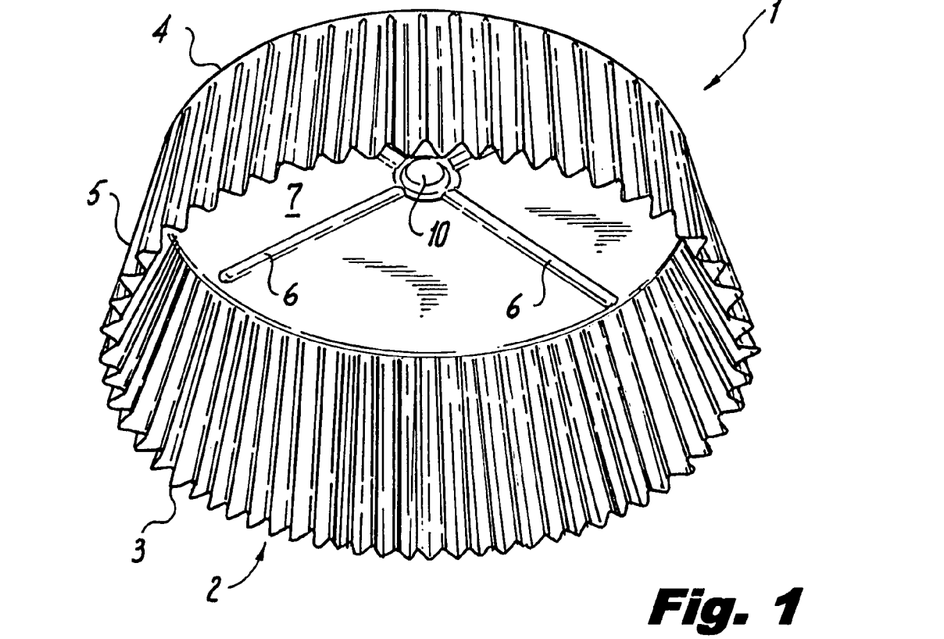
FIG. 1 shows an inverted perspective view of the present invention to show its design.

FIG. 1 shows the preferred embodiment of Food Shield 1 in the shape of a truncated cone, in perspective inverted view, having bottom open face 2 bounded by circumferential bottom edge 3. Bottom 2 is open to allow the food shield to be placed over an open serving dish or container to encompass the food within the interior portion of the disposable microwave food shield.

FIG. 1 shows bottom edge 3 and top edge 4 both respectively contiguous with side 5. In the preferred embodiment shown in FIG. 1, side 5 is pleated to provide rigidity to allow the invention to maintain its shape during use in a microwave oven. Alternately, in a non-preferred embodiment, side 5 may be corrugated, the difference between pleats and corrugations being that pleats have relatively sharp-pointed peaks and valleys whereas corrugations comprise a continuously and regularly undulating curved surfaced. Both pleats and corrugations will provide the needed rigidity. Non-preferred embodiments may be polygonal in shape; if so there will be a plurality of sides 5. The present invention is thus provided with at least one side 5.

As shown in FIG. 1, the at least one side 5 projects downwardly from top face 7 where the angle preferably subtended between side 5 and top surface 7 may range from approximately 90° to about 135°, with the most preferred angle being about 112°. Preferably, the vertical height from bottom edge 3 to top edge 4 is between about 2 and about 6 inches, with the most preferred height about 3 inches.

FIG. 1 shows top surface 7 bounded by top edge 4. A pair of centrally intersecting radial reinforcing ribs 6 extend diametrically across top surface 7 starting from and finishing at top edge 4. Alternately, in non-preferred embodiments shown in FIGS. 10-15, reinforcing ribs 6 need not be radially disposed nor need they necessarily intersect each other or intersect top edge 4; the reinforcing function can be accomplished if at least one reinforcing rib 6 is disposed somewhere on top surface 7. The placement and design of the at least one reinforcing rib 6 is a user-selectable feature of the present invention. For example, but without limitation, rib 6 may be linear, curved, circular, elliptical, plural circular concentric, plural circular eccentric, and so forth. Similar equivalent placements of at least one rib 6 will be understood by persons of ordinary skill in the art not to deviate from the essence of the present invention.

FIG. 1 shows Food Shield 1 being preferably circular, and is preferably made of a substantially circular unitary piece of porous, absorbent, breathable hygienic, non-hazardous food-grade paper. Weights of acceptable commercially available paper useable for the present invention are found in 32 g, 40 g and 52 g weights, with 40 g weight being preferable.

FIG. 1 shows the at least one reinforcement rib 6 of the preferred embodiment is comprised of folded paper and extends radially across top surface 7. Rib 6 is preferably about 0.09 inches to about 0.25 inches wide, but preferably about 0.12 inches wide,. A preferably circular reinforcing member 10 is provided in the preferred embodiment. Member 10 serves to additionally reinforce upper surface 7, but sufficient reinforcement will be furnished by at least one rib 6 so that member 10 is an optional, non-critical user-selectable design element of the present invention. Non-preferred embodiments may omit it. Member 10 need not be circular and could be user-selectably square-shaped or polygonal, elliptical or even irregular in shape. Member 10 as shown is a folded paper supplemental reinforcing structure preferably about 0.4 inches to about 1.2 inches in diameter, but preferably about 0.8 inches in diameter. The at least one reinforcing rib 6 preferably intersects reinforcing member 10 as shown. The combination of at least one reinforcing rib 6 and reinforcing member 10 furnishes structural support to the top surface to prevent top surface 7 from sagging onto the food underneath during use.

Figure 2:
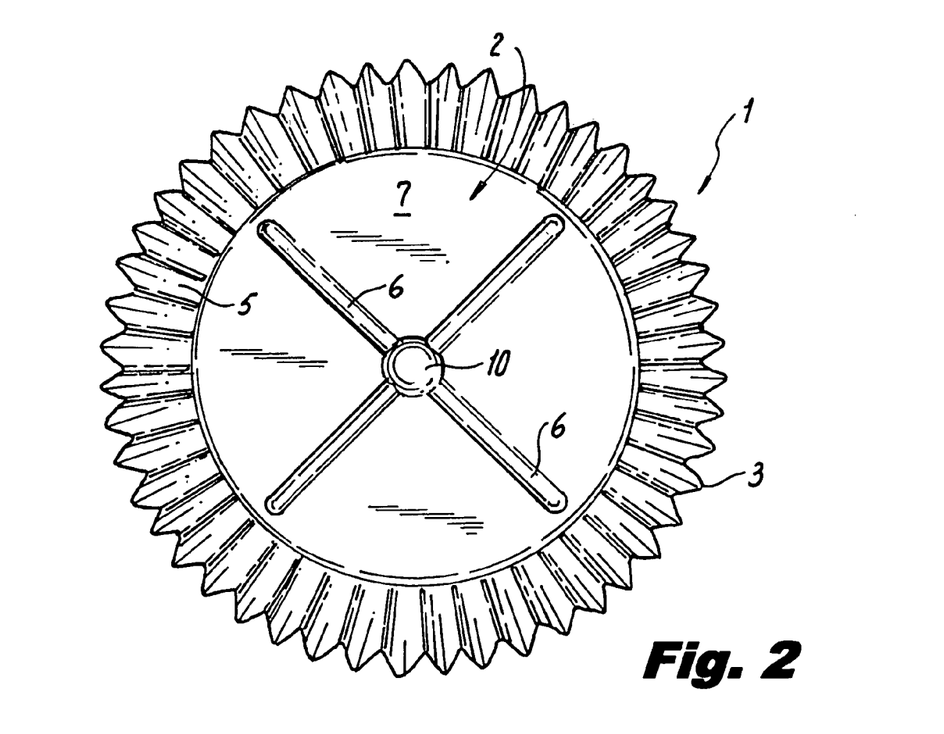
FIG. 2 shows a bottom view of the present invention.

FIG. 2 shows a bottom view of the preferred embodiment. Top surface 7 is shown having central circular reinforcing member 10 intersected by radially extending reinforcing ribs 6.

As explained above, at least one side 5 is preferably pleated and may alternately be corrugated. The number of pleats or corrugations of side 5 may be from about 4 to about 100 in number, but preferably about 70 when the top surface (as in the preferred embodiment) has a diameter of about 8.5 inches and the open bottom (also the preferred embodiment) has a diameter of about 11 inches. While the number of pleats or corrugations may vary in non-preferred embodiments, the ratio of the approximate number of pleats or corrugations to the approximate diameter of either the top or bottom surface should preferably be approximately maintained.

For example, the preferred embodiment has about 70 pleats with a top surface diameter of about 8.5 inches. The ratio of number of pleats to top surface diameter is approximately 70 divided by approximately 8.5 for a ratio of approximately 8.24. Preferably, this ratio of number of pleats or corrugations to diameter should approximately be maintained. In this way the size of the food shield of the present invention can be scaled up or down to fit the convenience of the consumer without altering its basic design, structure or functionality.

Although the calculation is not presented here, the exact same type of ratio could be developed for number of pleats or corrugations divided by bottom diameter, as will be appreciated by those of ordinary skill in the art.

Figure 3:
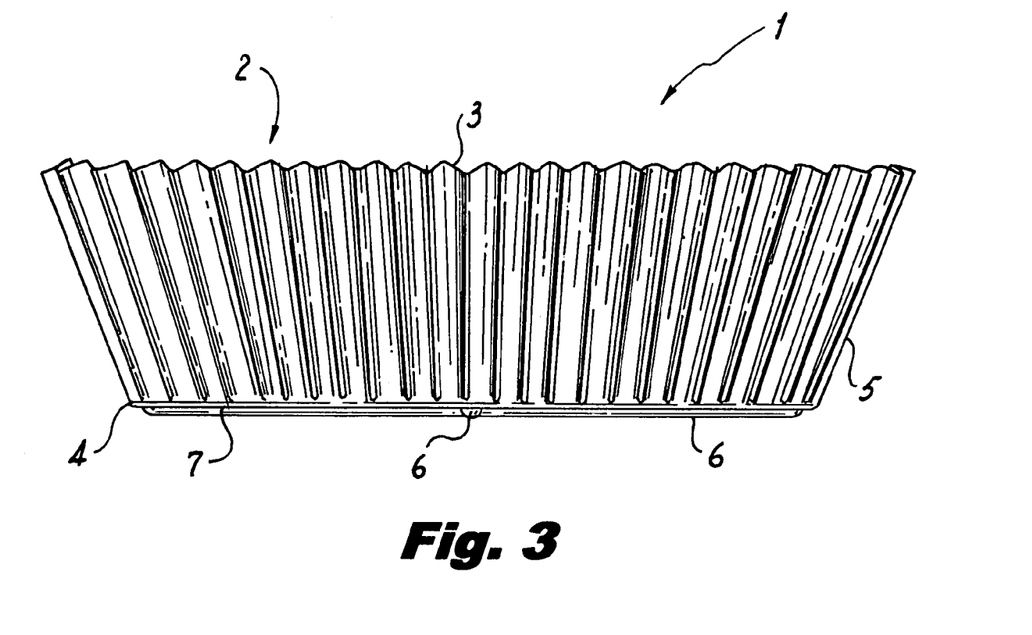
FIG. 3 shows an inverted side elevation of the present invention.

FIG. 3 shows an inverted side view of the preferred embodiment.

The diameter of upper surface 7 is preferably about 8.5 inches but may alternately range from about 3 inches to about 12 inches. With top surface 7 having a preferred subtended angle of about 112 degrees with side 5, the diameter of bottom 2 is accordingly determined. In practice, it may be that a series of different sized embodiments of the present invention may be preferable to specifying a single size. This is due to the ingenuity of consumers, whose desire for convenience may dictate use of different sized embodiments of the present invention for varying microwave cooking situations.

For example, a relatively large sized embodiment of the present invention would be useful when heating food in a microwave where the food is situated on a full sized dinner plate; but a smaller embodiment of the present invention might be preferable for microwaving a small glass or dish of food. The open diameter at the bottom may range from 5 inches to 15 inches, again where a variety of sizes available to consumers is preferable to specifying a single size so as to maximize consumer convenience.

Figure 4:
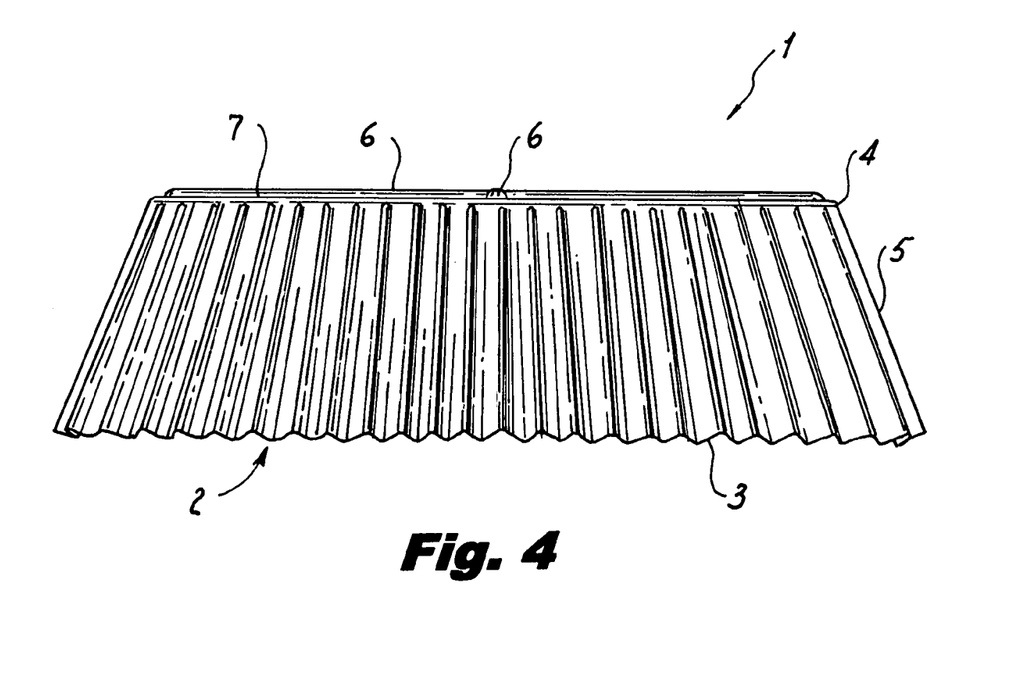
FIG. 4 shows a side elevation of the present invention in its normal position as it would be placed over a dish.

FIG. 4 shows a side view of the preferred embodiment.

Figure 5:
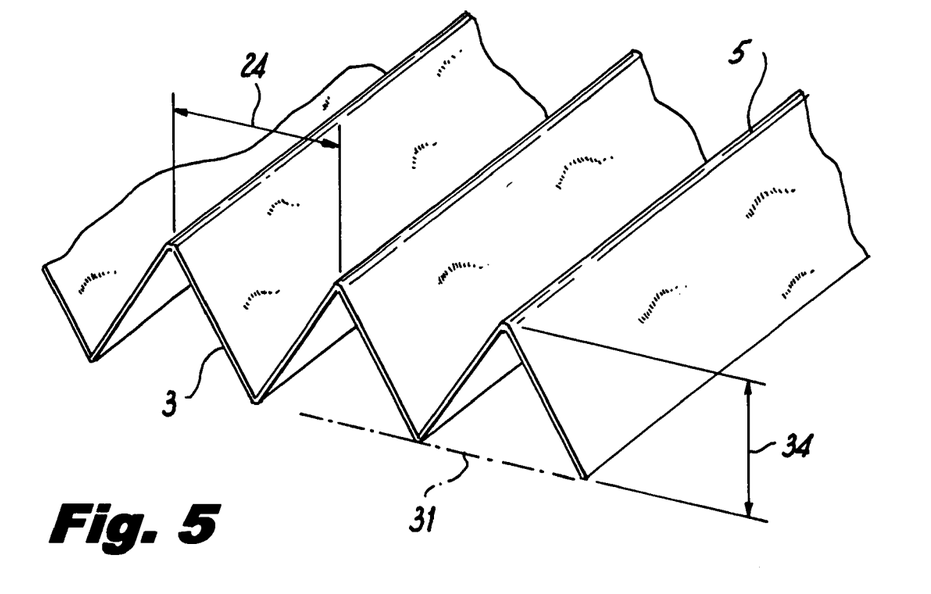
FIG. 5 shows a detail view of a section of pleats, showing the length and the height measurements of the pleats.

FIG. 5 shows a cut away perspective of pleats showing interpeak distance 24, imaginary baseline 31 and peak height 34. Distance 24 between pleat peaks 21 may be from about 2 mm to about 8 mm, but preferable distance 24 should be about 4 mm. Pleat height 34 is the distance between an imaginary line 31 and peak 21. Height 34 should preferably be about the same 4-mm length as distance 24, and thus pleat size may be described as being preferably 4 mm because in the preferred embodiment, this 4 mm distance refers to both peak-to-peak distance 24 and to pleat height 34. Thus, even though the ratio of peak-to-peak pleat distance 24 to pleat height 34 is preferably about 1.00, persons of ordinary skill in the art will understand that there may be differences between pleat peak distance 24 and pleat height 34 (and thus differences in the ratio therebetween) without fundamentally altering the design, structure or functionality of the present invention.

Figure 6:
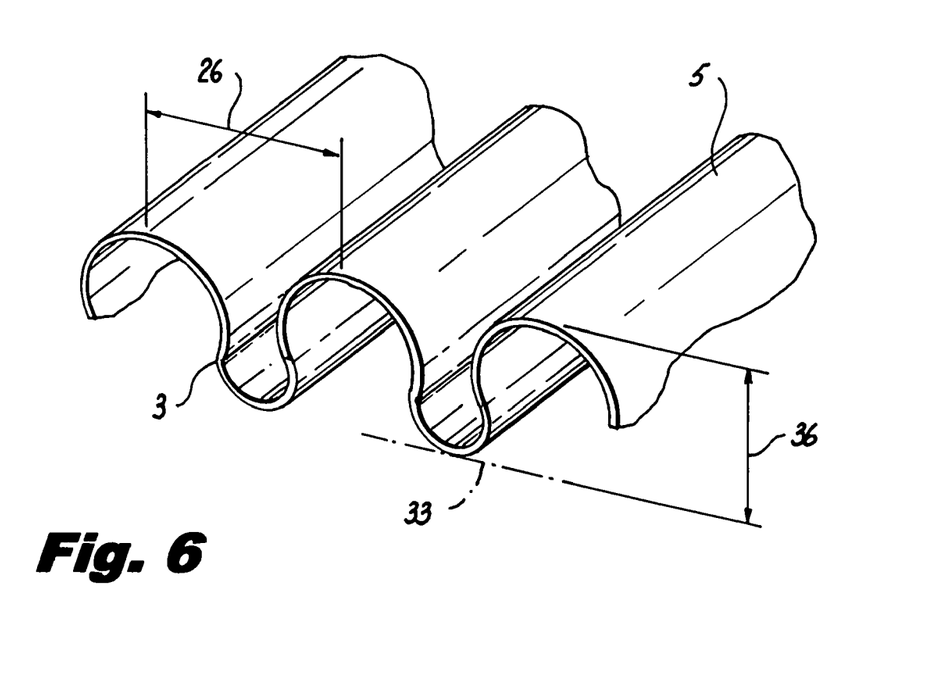
FIG. 6 shows a detail view of a section of corrugations, showing the length and the height measurements of the corrugations.

FIG. 6 shows a cut away perspective of corrugations showing intercorrugation distance 26, imaginary baseline 33 and corrugation height 36. Distance 26 between corrugations may be from about 2 mm to about 8 mm, but preferable distance 24 should be about 4 mm. Corrugation height 36 is the distance between an imaginary line 33 and the maximum height of a corrugation. Height 36 should preferably be about the same 4-mm length as distance 26, and thus corrugation size may be described as being preferably 4 mm. The ratio of corrugation distance 26 to corrugation height 36 is preferably about 1.00, but persons of ordinary skill in the art will understand that there may be differences in this ratio without fundamentally altering the design, structure or functionality of the present invention.

Figures 7, 8, 9:
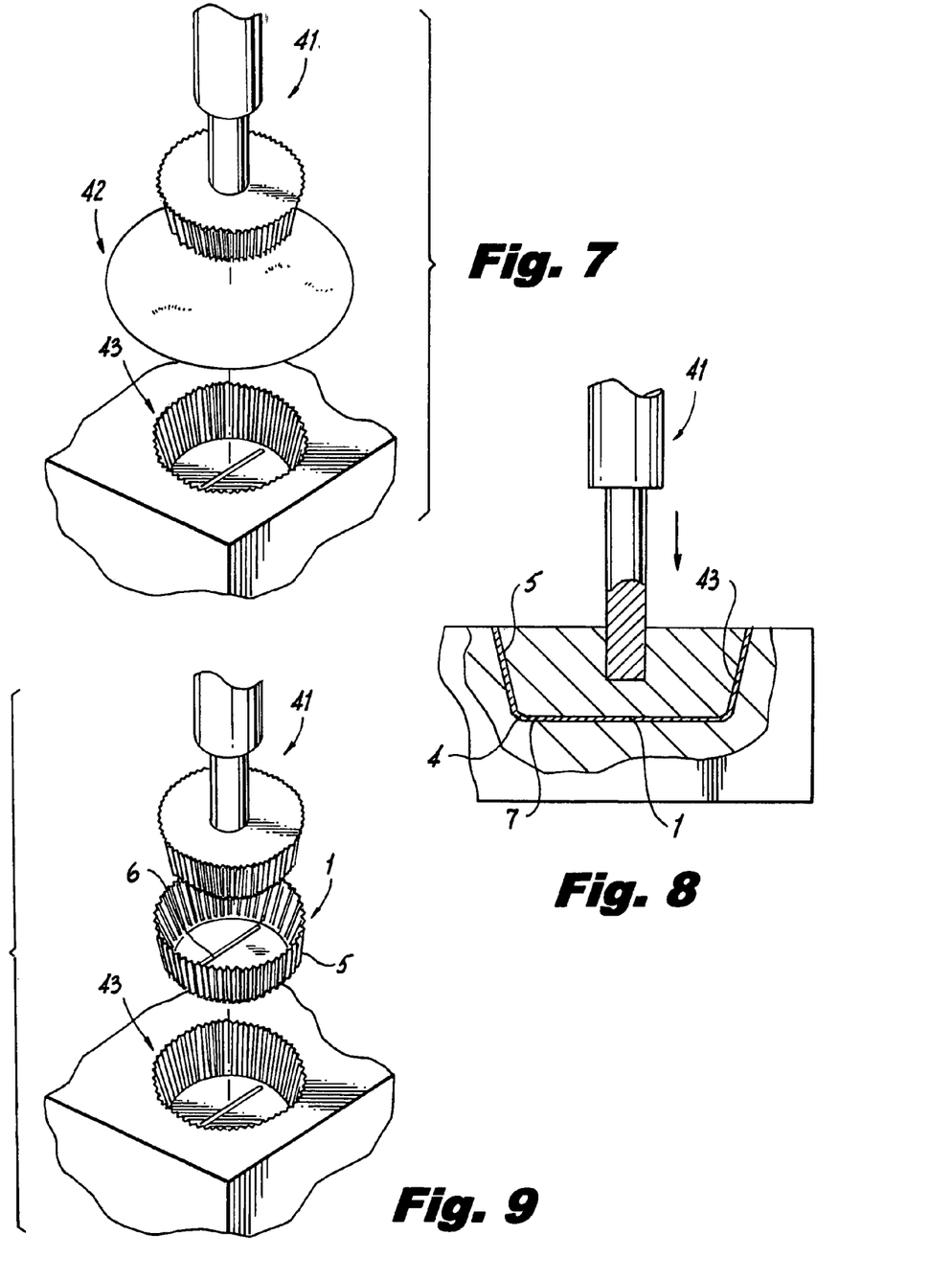
FIG. 7 shows an exploded perspective view of the die-stamping process for making the present invention.
FIG. 8 shows a cross-sectional view of the method of making the present invention; shown is a die impressing a sheet of stock during the stamping process.
FIG. 9 shows an exploded perspective view illustrating the removal of a finished stamped production piece of the present invention.

FIG. 7 is an exploded perspective view illustrating the die stamp process of making the food shield of the present invention. A large roll of food-grade paper stock is pulled into a press by an infeed roller. Once inside the press, a progressive die stamping operation occurs.

A preliminary step is to blank out the proper size circles which will then be formed into the finished product. Preferably a paper blank about 15-inches in diameter will be needed to make the preferred embodiment. Next, the circles of blanked out paper are positioned over the female cavities of the blanking die. Once in position, the paper 42 will be die pressed into the female cavities 43 by mating male plunger 41. Plunger 41 will have the male halves of the pleats or corrugations and also the male half of the at least one reinforcement rib 6; the female cavities 43 will have the corresponding female halves of the pleats or corrugations and at least one reinforcement rib 6. Once the two die halves 41 and 43 fully cycle, the paper 42 will be formed into the final product.

This method of pressing paper blanks 42 into finished products is a very fast and efficient method and will most likely be done 4 at a time. As those of ordinary skill in die stamping will know, the finished product exits the die stamping machine, the individual finished food shield products are cut and are automatically packaged.

FIG. 8 shows a cross-section of a die with plunger 41 pressing paper stock 42 into matching die cavities 43.

FIG. 9 shows an exploded perspective view illustrating the removal of finished stamped paper piece 42 from respective die halves 41 and 43.

FIGS. 10-15 show various embodiments for the structural configuration of top surface 7 of the present invention. Reinforcing rib 6 structure(s) may be radially or non-radially disposed, curved, circular, concentric or non-concentric, embossed so as to comprise a logo or design, comprised of both straight and curved ribs and may be combined with reinforcing member(s) 10 as selected by a user. There are many similar variations that will be understood by persons of ordinary skill in the art to be equivalent without deviating materially from the essence of the present invention.

Figures 10, 11, 12:
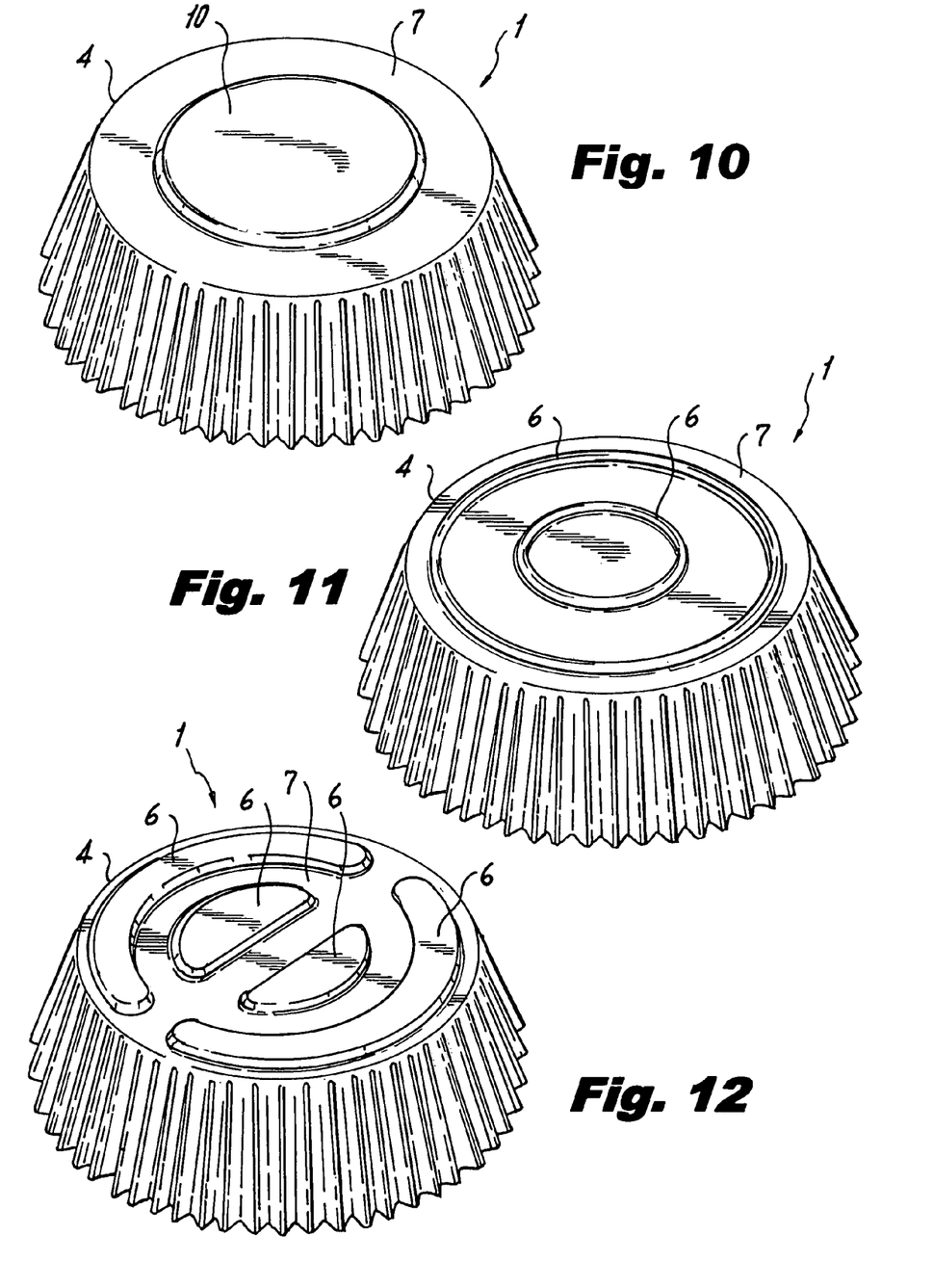
FIGS. 10 through 15 show alternate embodiments of the present invention in perspective view. The difference among and between FIGS. 10-15 is in the designs for the top-surface reinforcing structure(s).

FIG. 10 shows a perspective view where a reinforcing rib on top surface 7 is a single circular reinforcing member 10 concentrically arranged with respect to top surface 7; reinforcing member 10 is shown spaced apart from top edge 4.

FIG. 11 shows a perspective view wherein reinforcing rib 6 is comprised of at least two concentric rings spaced apart from each other and from top edge 4.

FIG. 12 shows a perspective view of an alternate arrangement for ribs 6. Pairs of opposing semi-circular ribs 6 surround centrally located additional rib 6 elements.

Figures 13, 14, 15:
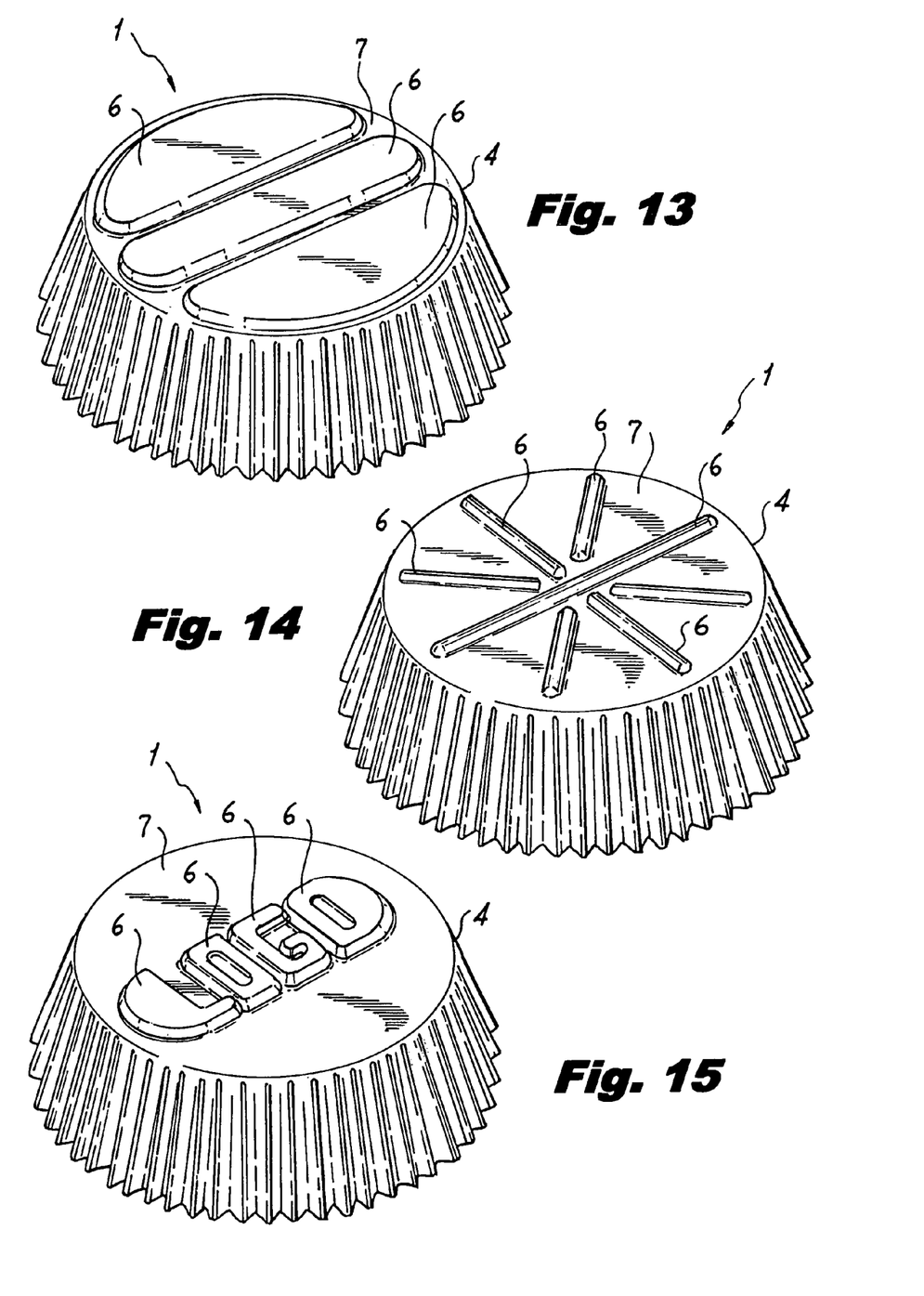

FIG. 13 shows a perspective view where top surface 7 has ribs 6 comprised of at least two laterally arranged elements where each element is a pair of ribs 6 where the pair are connected at both ends by respective round-shaped rib 6 elements. In turn the laterally arranged rib 6 elements are surrounded by semicircular rib 6 elements, where the semicircular elements also comprise parallel pairs of rib 6 elements connected at both ends by respective round-shaped rib 6 elements. All of the rib 6 elements of FIG. 13 are shown spaced apart from top edge 4.

FIG. 14 shows a perspective view wherein top surface 7 has ribs 6 that comprise at least two straight, radially disposed elements spaced apart from each other and from top edge 4.

FIG. 15 shows a perspective view in which top surface 7 has ribs 6 arranged in the form of a user-designed pattern, such as a logo.

Without deviating from the design or spirit of the present invention the foregoing drawing figures comprise merely examples of how the Food Shield of the present invention may be configured for utility and convenience. Those of ordinary skill in the art will understand that variations of the foregoing examples will nonetheless constitute the invention claimed below.

What is claimed is:

1. A disposable microwave food shield in combination with a microwavable open serving dish, comprising:
    said food shield comprising a unitary completely solid circular upper face, said circular upper face having at least one reinforcement member embossed into said upper face extending along an upper surface of said upper Thee for preventing sagging of said upper face onto food in said dish;
    a substantially conical side portion having an upper edge and a lower edge, said conical side portion being pleated with undulating downwardly extending top to bottom folded flat non-curved sections, each said flat non-curved section folded linearly upon itself along straight top to bottom fold line corners, for imparting rigidity to said conical side portion, and said conical side section projecting substantially downwardly from said circular upper face; providing an unencumbered open bottom; covering food contained within said dish; and
    said upper face and said conical side portion being made only of a paper based absorbent material and of sufficient rigidity to remain standing free of support on said dish completely covering said food during micro waving of said food.

2. The disposable microwave food shield of claim 1 wherein said top surface is substantially circular and has a diameter of between three (3) and twelve (12) inches and said at least one side having means for structurally reinforcement.

3. The disposable microwave food shield of claim 2 wherein an angle subtended between said top surface and said at least one side is from about 90° to about 135°.

4. The disposable microwave food shield of claim 3 wherein said opening described by said bottom edge has a diameter of from about five(5) to about fifteen (15) inches.

5. The disposable microwave food shield of claim 4 wherein said food shield is made of an absorbent, paper material.

6. The disposable microwave food shield of claim 5 wherein said at least one side has from about 4 to about 100 pleats.

7. The device of claim 6 wherein the number of pleats is from about 50 to about 100.

8. The device of claim 7 wherein the number of pleats is about 70.

9. The device of claim 5 wherein the ratio of number of pleats to top surface diameter is approximately 0.5.

10. The device of claim 5 wherein the ratio of number of pleats to a top surface diameter of said upper face is approximately 2.35.

11. The device of claim 5 wherein the ratio of number of pleats to a top surface diameter of said upper face is approximately 3.53.

12. The device of claim 5 wherein the ratio of number of pleats to a top surface diameter of said upper face is approximately 5.88.

13. The device of claim 5 wherein the ratio of number of pleats to a top surface diameter of said upper face is approximately 8.24.

14. The device of claim S wherein the size of pleats is from about 2 mm to about 10 mm.

15. claim 5 wherein the size of pleats is from about 3 mm to about 6 mm.

16. The device of claim 5 wherein the size of pleats is about 4 mm.

17. The device of claim 1 wherein said top surface has at least one reinforcing member in addition to said at least one reinforcing member.

18. The device of claim 1 wherein said at least one reinforcing member comprises a user-selectable pattern.

* * * * *